(12) United States Patent
Dervault

(10) Patent No.: US 9,090,338 B2
(45) Date of Patent: Jul. 28, 2015

(54) PROTECTION PANEL AND LANDING GEAR MODULE COMPRISING IT

(75) Inventor: Franck Dervault, Plaisance du Touch (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 250 days.

(21) Appl. No.: 13/056,423

(22) PCT Filed: Jul. 31, 2009

(86) PCT No.: PCT/FR2009/000966
§ 371 (c)(1),
(2), (4) Date: Jan. 28, 2011

(87) PCT Pub. No.: WO2010/012913
PCT Pub. Date: Feb. 4, 2010

(65) Prior Publication Data
US 2011/0174923 A1  Jul. 21, 2011

(30) Foreign Application Priority Data

Jul. 31, 2008  (FR) ...................................... 08 55310

(51) Int. Cl.
*B64C 1/10* (2006.01)
*B64C 25/00* (2006.01)
*B64C 1/06* (2006.01)
*B64C 25/16* (2006.01)

(52) U.S. Cl.
CPC . *B64C 25/00* (2013.01); *B64C 1/06* (2013.01); *B64C 25/16* (2013.01)

(58) Field of Classification Search
USPC ................... 244/117 R, 119, 121, 131, 123.1
See application file for complete search history.

(56) References Cited

U.S. PATENT DOCUMENTS

| 1,894,582 A | * | 1/1933 | De Bell ...................... 244/102 R |
| 3,670,996 A | * | 6/1972 | Jenny ......................... 244/103 R |
| 4,252,355 A | | 2/1981 | Goupy et al. |
| 4,408,736 A | * | 10/1983 | Kirschbaum et al. ..... 244/100 R |
| 4,460,205 A | | 7/1984 | Glance |
| 4,479,621 A | * | 10/1984 | Bergholz .................. 244/117 R |

(Continued)

FOREIGN PATENT DOCUMENTS

| EP | 0 354 403 | 2/1990 |
| EP | 1 464 915 | 10/2004 |

(Continued)

OTHER PUBLICATIONS

International Search Report Issued Nov. 19, 2009 in PCT/FR09/000966 filed Jul. 31, 2009.

*Primary Examiner* — Brian M O'Hara
*Assistant Examiner* — Keith L Dixon
(74) *Attorney, Agent, or Firm* — Oblon, McClelland, Maier & Neustadt, L.L.P.

(57) ABSTRACT

The invention relates to a protection panel (115) for a vehicle that comprises an outer surface (140) including at least one composite material, and is mounted via deformable parts on a mounting (135) attached to the vehicle structure. The deformable parts are attached to several stiffening parts (145) of the mounting. In some embodiments, the deformable parts are perpendicular to the outer surface of the panel and are capable of buckling under the effect of impacts. In some embodiments, the deformable parts are in the form of clips, the composite material consists of CFRP and the mounting is rigid.

10 Claims, 3 Drawing Sheets

(56) References Cited

U.S. PATENT DOCUMENTS

| | | | |
|---|---|---|---|
| 5,058,827 A * | 10/1991 | Dansereau et al. | 244/103 R |
| 5,085,382 A | 2/1992 | Finkenbeiner | |
| 5,126,190 A * | 6/1992 | Sakatani et al. | 442/205 |
| 5,542,626 A * | 8/1996 | Beuck et al. | 244/107 |
| 5,843,558 A * | 12/1998 | Yoshizaki et al. | 428/112 |
| 6,199,937 B1 | 3/2001 | Zetouna et al. | |
| 6,702,911 B2 * | 3/2004 | Toi et al. | 156/93 |
| 6,719,865 B2 * | 4/2004 | Kasahara et al. | 156/184 |
| 6,845,943 B2 * | 1/2005 | Chambers et al. | 244/103 R |
| 7,080,805 B2 * | 7/2006 | Prichard et al. | 244/117 R |
| 7,946,531 B2 * | 5/2011 | Jackson | 244/121 |
| 7,997,529 B2 * | 8/2011 | Koch et al. | 244/117 R |
| 7,997,534 B2 * | 8/2011 | Eberth | 244/131 |
| 2001/0010345 A1 * | 8/2001 | Clifford | 244/119 |
| 2005/0281987 A1 | 12/2005 | Starke | |
| 2007/0029443 A1 | 2/2007 | Manz | |
| 2008/0210824 A1 * | 9/2008 | Eberth | 244/131 |
| 2008/0257671 A1 | 10/2008 | Jacob et al. | |
| 2009/0314891 A1 * | 12/2009 | Haack | 244/119 |

FOREIGN PATENT DOCUMENTS

| | | |
|---|---|---|
| EP | 1 607 272 | 12/2005 |
| FR | 2 871 725 | 12/2005 |
| GB | 2 022 212 | 12/1979 |
| GB | 2 346 117 | 8/2000 |
| WO | 2005 100152 | 10/2005 |
| WO | 2008 015360 | 2/2008 |

* cited by examiner

PROTECTION PANEL AND LANDING GEAR MODULE COMPRISING IT

TECHNICAL FIELD

This invention relates to a protective panel and a landing gear module comprising same. It is intended to reduce the weight of a protective panel and to improve the resistance to impacts, in particular to tire impacts on a boat panel. It thus applies, in particular, to the aeronautical field.

BACKGROUND

For airplanes of known type, the boat panel, positioned at the back of a landing gear and protecting the fuselage from debris and pebbles stirred up by the rolling of the tires during takeoff or landing, is made of aluminum and therefore has a coefficient of elongation to breaking, that is to say the rate of maximum elongation before breaking, of 9%. Because of the presence of frames with return at the aluminum skin, which are very rigid, when there is an impact between two frames, only the skin over a distance between the frames involved is acted upon and therefore the elongation over the panel is maximized, since the frames do not provide any latitude in radial deformation.

This metal panel is heavy, however, and therefore does not meet present-day needs to make airplanes lighter.

SUMMARY

This invention is intended to remedy these drawbacks. To this end, this invention applies to a protective panel for a vehicle, characterized in that its outer surface comprises at least one composite material and in that the said protective panel is mounted, by means of deformable parts, on a support linked to the structure of the vehicle, the rate of deformation of the said deformable parts being adapted to the coefficient of breaking elongation of the outer surface so that several said deformable parts become deformed before the outer surface breaks.

By virtue of these provisions, an advantage is gained from the lightness of the composite material. In the event of impact, the deformation of the deformable parts allows, in comparison with the rigid supports of the aluminum panels of the prior art, an extension of the deformation of the outside surface over a large expanse which, despite the low coefficient of elongation to breaking (typically less than 2%), improves the resistance to impacts. In this way, the low coefficient of elongation to breaking is compensated by the incorporation of deformable parts. The deformable parts thus make up "fusible" parts during impact.

According to specific characteristics, the said deformable parts take the form of clips.

According to specific characteristics, the said composite material is made of CFRP (acronym for "carbon fiber reinforced plastic" for plastic reinforced with carbon fibers).

According to specific characteristics, the said support is rigid.

According to specific characteristics, the deformable parts are attached to several stiffening parts of the support. These stiffening parts are called "stringers" or "frames."

According to specific characteristics, the deformable parts are perpendicular to the outer surface of the panel and adapted for buckling under the effect of impacts.

In fact, the increase in height allows making the deformable parts clearly less resistant to compression loads perpendicular to the fuselage and therefore buckle under impact.

That then makes it possible to act on the outer surface of the panel, or "skin" bending out of plane, for example over three intervals between the stiffening elements, instead of only one in the prior art.

According to a second aspect, this invention applies to a landing gear module characterized in that it comprises a landing gear and a protective panel that is the object of this invention, as briefly set forth above.

According to a third aspect, this invention applies to an aircraft, characterized in that it comprises at least one landing gear module such as briefly set forth above.

Since the specific advantages, purposes and characteristics of this module are similar to those of the panel that is the object of this invention, such as briefly set forth above, they are not repeated here.

BRIEF DESCRIPTION OF THE DRAWINGS

Other specific advantages, purposes and characteristics of this invention will become apparent from the description that is going to follow, in an explanatory and no way limitative intent, with reference to the attached drawings, in which.

DETAILED DESCRIPTION

Figure 1:
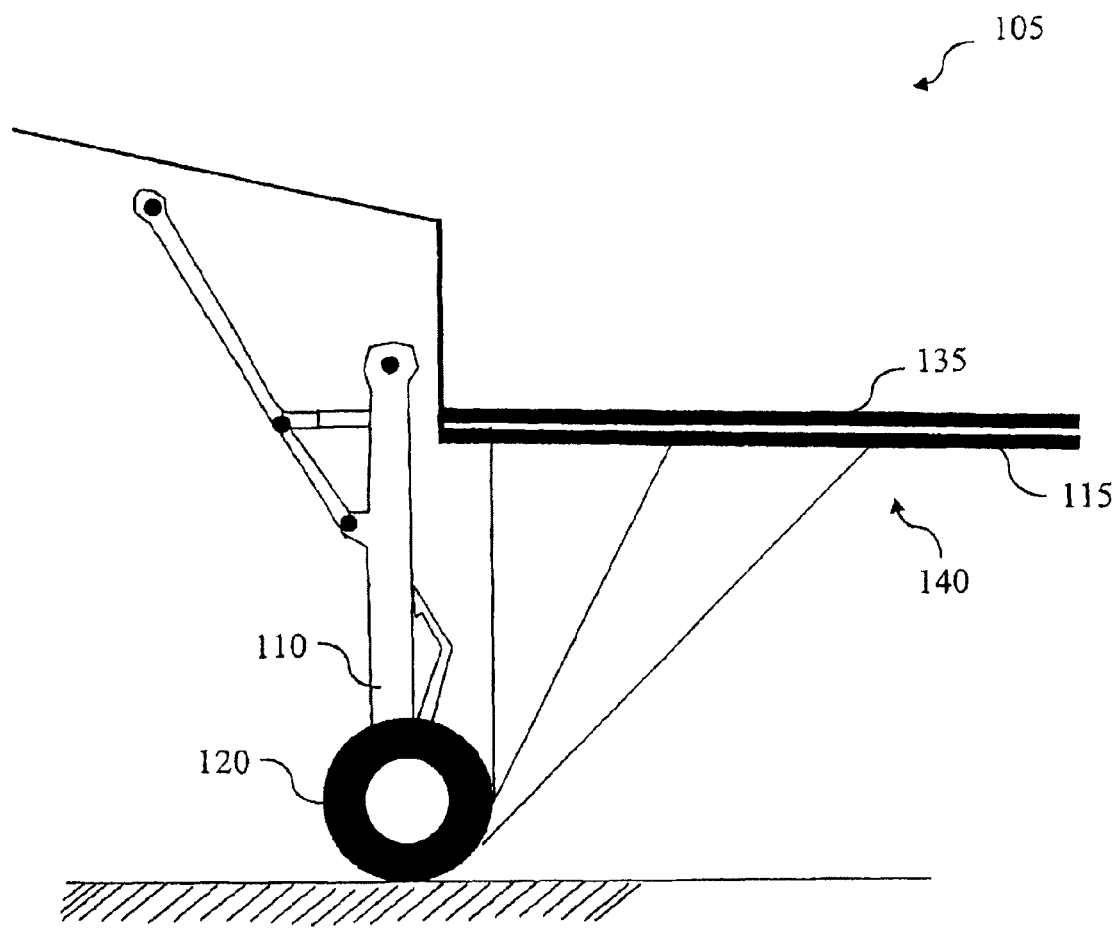
FIG. 1 schematically shows a specific embodiment of the landing gear module that is the object of this invention.

A landing gear module 105 comprising a landing gear 110 and a protective panel 115, also called "boat panel," are seen on FIG. 1. Since the front of the airplane is on the left of FIG. 1, it is understood that during rolling, on takeoff or on landing, tires 120 of gear 110 may stir up debris or pebbles and project them, at the back, toward the fuselage of the airplane. Protective panel 115 is intended to protect the fuselage from these impacts.

Figure 3:
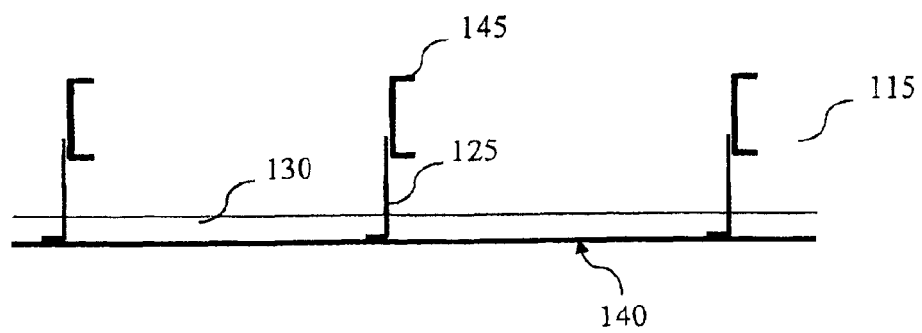
FIG. 3 shows, schematically and in section, a specific embodiment of the protective panel that is the object of this invention.

In accordance with this invention and as illustrated on FIG. 3, outer surface 140 of protective panel 115 is essentially made of composite material, for example of CFRP produced by an automatic fiber placement machine in which folds are positioned layer by layer by using a machine that places them by wrapping. Moreover, this panel has deformable parts 125 between outer surface 130, or "skin" of panel 115 and a rigid support 135 forming the structure of the panel and linked to the structure of the airplane. Rigid support 135 comprises rigid inner frames 145.

Deformable parts 125 are perpendicular to outer surface 140 of protective panel 115 and are adapted for buckling under the effect of impacts.

The deformable parts have a deformation rate (in length of deformation per unit of force applied) adapted to the coefficient of breaking elongation of the outer surface, so that several deformable parts become deformed before the outer surface breaks. In other words, the breaking force of the outer surface corresponds to a multiple of the force that suffices for the deformation of a deformable part, the multiple considered being all the higher as the coefficient of breaking elongation is lower. For example, when the coefficient of breaking elongation is divided by two, this multiple is doubled.

In this way deformable parts 125 allow an extension of the zone of the panel that is deformable in the event of impact, in comparison with the rigid structures of the metal boat panels of known type. In order that these deformable parts 125 may become deformed in the thickness of protective panel 115, the latter is thicker than the usual boat panels made of aluminum.

In this way, the low elongation to breaking of the composite material of the skin, less than 2% in the case of CFRP, is compensated by a significant thickening of protective panel 115 allowing the deformation of deformable parts 125.

Figure 2:
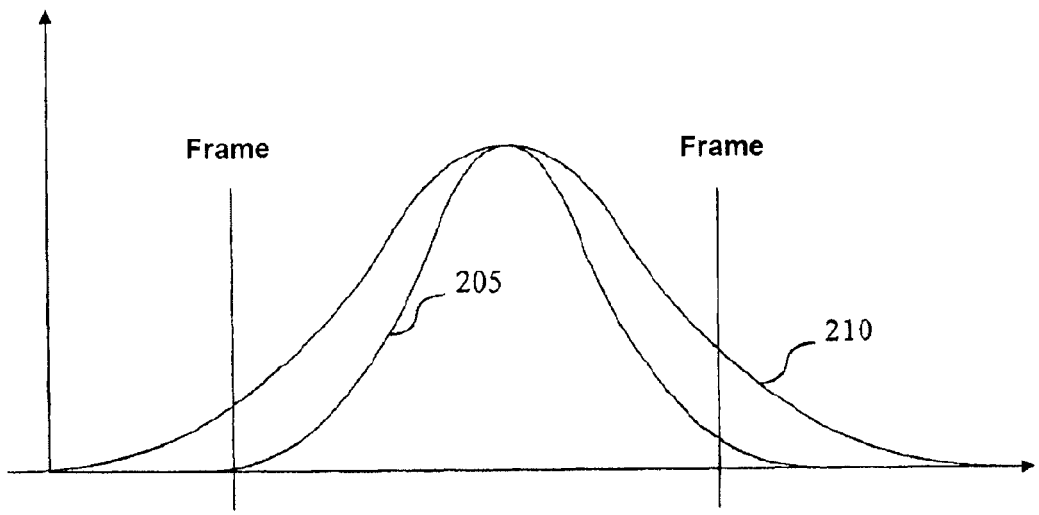
FIG. 2 shows, schematically and in section, a panel deformation produced by the implementation of this invention.

FIG. 2 shows deformation curves for the outer surface of the protective panel, for a skin made of aluminum, curve 205, and for a panel that is the object of this invention, curve 210.

It is seen that, for the same breaking-through of the skin:
curve 205 shows an extension of the deformation more or less limited to the length of an interval between two frames 215, while
curve 210 shows an extension of the deformation over three intervals between frames 215.

Figure 4:
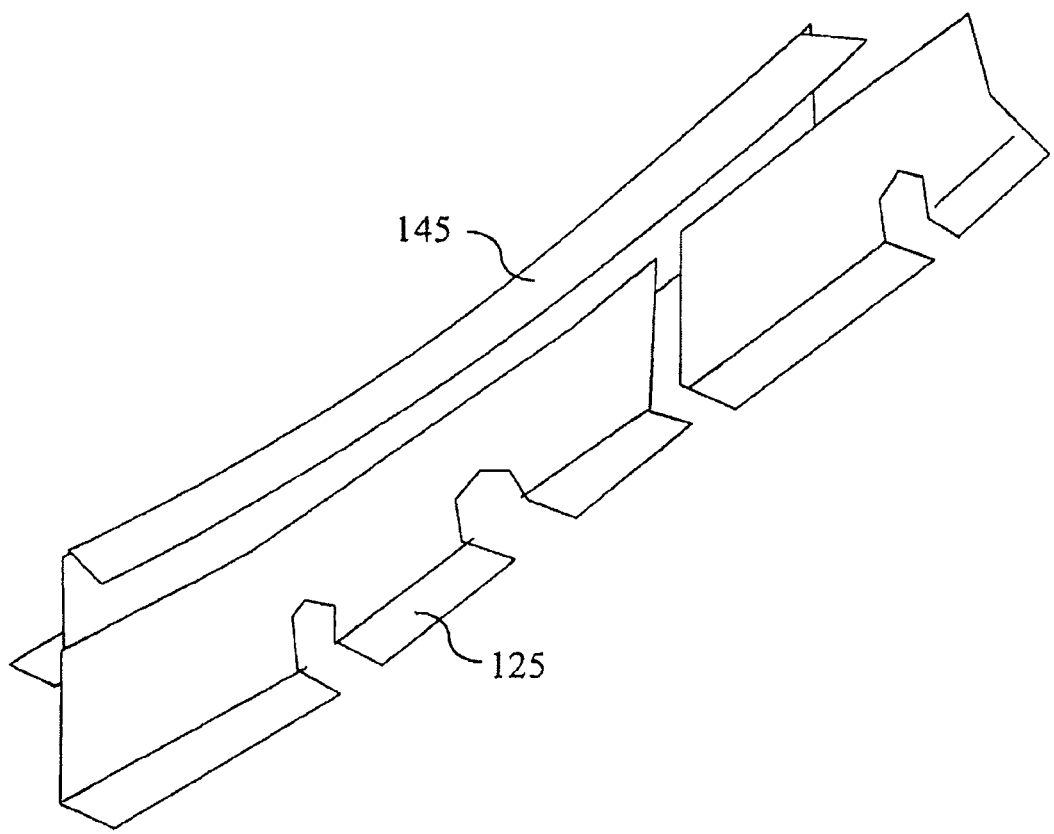
FIG. 4 shows, schematically and partially, in perspective, a specific embodiment of the protective panel that is the object of this invention.

FIG. 4 illustrates a type of respective arrangement of outer surface 140, deformable parts 125 and frames 145. Deformable parts 125 here take on the form of clips perpendicular to outer surface 140. In the case shown on FIG. 4, frames 145 are adapted for supporting stringers (not shown).

Clips 125, attached to several stiffening parts (frames 145 or stringers) of panel 115, form fusible parts during impact. Clips 125 are poorly resistant to compression loads perpendicular to outer surface 140 and therefore buckle under impact. As set forth with reference to FIG. 2, that makes it possible to act on the skin bending out of plane over three inter-frames or inter-stingers and therefore to markedly reduce the elongation rate of the skin and, consequently, its risk of breaking.

On FIGS. 3 and 4, it is seen that floating frames 145 pass largely underneath outer surface 140. In comparison with the metal panels of the prior art, one goes from five millimeters of clearance to 25, or even 35 millimeters of distance between the skin and the frames.

The invention claimed is:

1. A protective panel on a landing gear module on an aircraft, comprising:
    a panel body having an outer surface including at least one composite material, the outer surface being exposed to an outside of the aircraft;
    a support forming a structure of the protective panel, the support being linked to a structure of the aircraft, and the support including a plurality of stiffening parts; and
    a plurality of deformable parts that mount the panel body to the support, the plurality of deformable parts being attached to one or more stiffening parts of the support,
    wherein a deformation rate of the plurality of deformable parts is correlated with a coefficient of breaking elongation of the outer surface so that, when the protective panel is impacted, the deformable parts become deformed before the outer surface breaks,
    wherein the deformable parts are disposed such that a height direction of extension of the deformable parts is oriented to extend perpendicular to the outer surface of the panel body, and
    wherein the deformable parts are configured to buckle under the effect of impacts.

2. The protective panel according to claim 1, wherein the deformable parts are clips.

3. The protective panel according to any one of claim 1 or 2, wherein the deformable parts are attached to several stiffening parts of the plurality of stiffening parts, which are frames.

4. The protective panel according to claim 3, wherein the deformable parts are attached to several stringers supported by the frames.

5. The protective panel according to claim 1, wherein the composite material of the outer surface is made of carbon fiber reinforced plastic.

6. The protective panel according to claim 1, wherein the support is rigid.

7. A landing gear module, comprising: a landing gear; and a protective panel according to claim 1.

8. An aircraft, comprising at least one landing gear module according to claim 7.

9. The protective panel according to claim 2, wherein the clips are longitudinally extending brackets having a first arm portion that extends at approximately a right angle away from a second arm portion, the first arm portion being longer than the second arm portion, and wherein the second arm portion is mounted to the panel body such that the first arm portion extends substantially perpendicularly to the outer surface of the panel body.

10. The protective panel according to claim 1, wherein the plurality of deformable parts mounts the panel body to the support such that the deformable parts are disposed between the panel body and the stiffening parts.

* * * * *